June 15, 1965  J. E. DAVIS  3,189,413
SPOT AND STRIPE APPLICATOR FOR CHROMATOGRAPHY
Filed Sept. 25, 1961  7 Sheets-Sheet 1

INVENTOR.
JOHN E. DAVIS
BY Flam and Flam
ATTORNEYS.

June 15, 1965 J. E. DAVIS 3,189,413
SPOT AND STRIPE APPLICATOR FOR CHROMATOGRAPHY
Filed Sept. 25, 1961 7 Sheets-Sheet 4

INVENTOR.
JOHN E. DAVIS
BY Flam and Flam
ATTORNEYS.

INVENTOR.
JOHN E. DAVIS
BY Flam and Flam
ATTORNEYS.

United States Patent Office 3,189,413
Patented June 15, 1965

3,189,413
SPOT AND STRIPE APPLICATOR FOR
CHROMATOGRAPHY
John E. Davis, Garden Grove, Calif., assignor to Bio-Science Laboratories, Los Angeles, Calif., a corporation of California
Filed Sept. 25, 1961, Ser. No. 140,597
34 Claims. (Cl. 23—253)

This invention relates to apparatus for use in connection with chemical analysis, and particularly, with chromatography. Chromatography technique involves measurements made with reference to spots formed by deposit of test solutions on paper. Usually, the paper bearing the spots is subjected to certain reagents for certain controlled time periods. Comparisons with spots made with standard solutions provide significant data.

In order to obtain significant results, the spot must be confined in diameter so that all of the solute of the test solution is concentrated. In the past, this has been accomplished manually with the aid of a laboratory pipette. Small aliquots of the test solution are applied at the same spot. If the aliquots are applied too fast, the spot expands beyond the tolerable limits. If the aliquots are applied at reasonably slow intervals, partial evaporation restores the ability of the area to absorb more of the test solution. It is a tedious job for a technician to apply a fraction of a cubic millimeter to a spot.

For some tests, stripes are provided instead of spots. In this case, the technician repeatedly retraces a line along the chromatography paper, allowing suitable time between successive stripes for partial evaporation.

The primary object of this invention is to provide improved apparatus for automatically performing the striping and spotting application.

Another object of this invention is to provide simplified controls whereby the apparatus can be easily operated.

Another object of this invention is to provide a novel pipette holder that can be quickly and accurately positioned for operation, and that can be refilled without disturbing its settings.

Another object of this invention is to provide a unique arrangement of parts that enables the apparatus to be accommodated in a relatively compact package.

Another object of this invention is to provide an improved paper holder.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now to described in detail, illustrating the general principles of the invention; but it is to be understood that this detailed description is not to be taken in a limiting sense, since the scope of this invention is best defined by the appended claims.

Referring to the drawings.

*Housing and paper holder*

Figure 1:
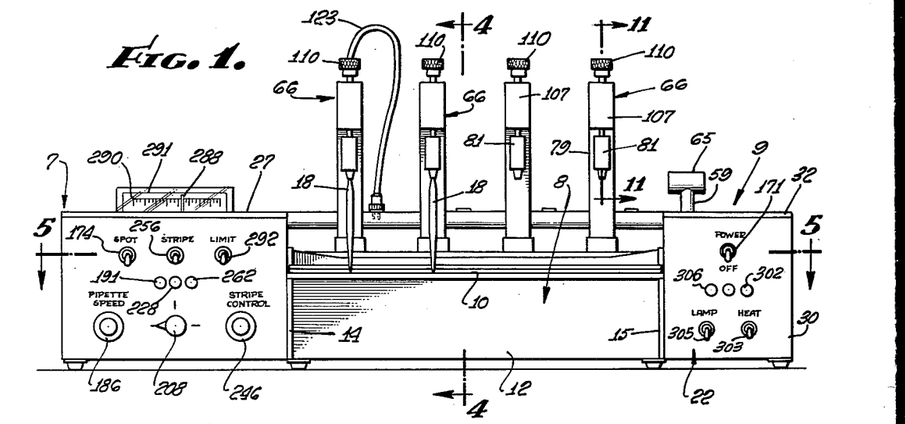
FIGURE 1 is a front elevation of the apparatus incorporating the present invention.
Figure 2:
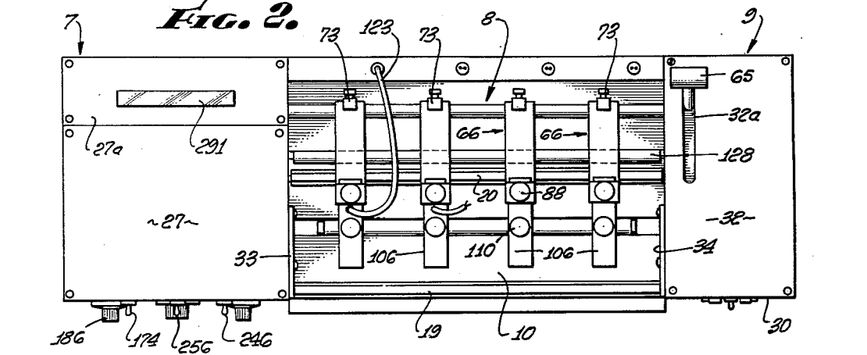
FIG. 2 is a top plan view thereof.

The generally rectangular apparatus illustrated in FIGS. 1 and 2 comprises three box-like sections 7, 8, and 9, secured together. The central section 8 is of less height than the end sections, and its cover plate 10 provides a bed or table upon which chromatography paper 11 (FIG. 4) may be placed.

Figure 3:
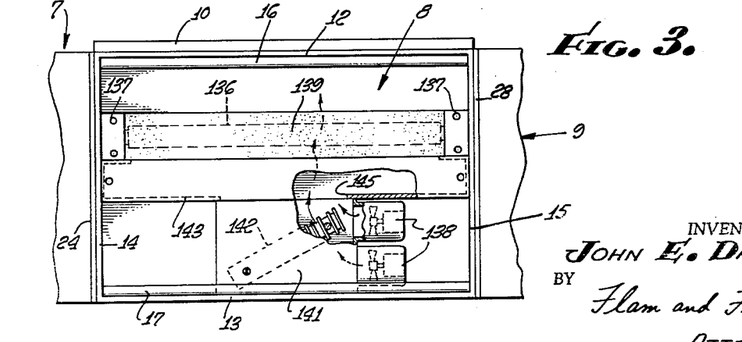
FIG. 3 is a fragmentary bottom plan view of the apparatus.

The central section includes front and rear panels 12 and 13 and left and right side panels 14 and 15 (see FIGS. 3, 4, and 8) and all made of aluminum or the like. Supporting rods 16 and 17 (FIGS. 3 and 4) extend between the side panels 14 and 15 along the front and back panels 12 and 13 to provide suitable structural support.

While the paper 11 is held upon the table 10, a pipette 18 (in a manner to be hereinafter described) deposits solution thereon to form a spot usable in chromatography techniques. In order to hold the paper suitably in place, two feet or clamp bars 19 and 20 are provided. These bars (FIGS. 4 and 5) extend in spaced parallel relationship along the entire length of the table 10.

The clamp bar 19 is located adjacent the forward edge of the table 10, and the clamp bar 20 is located substantially at the central portion thereof.

Figure 4:
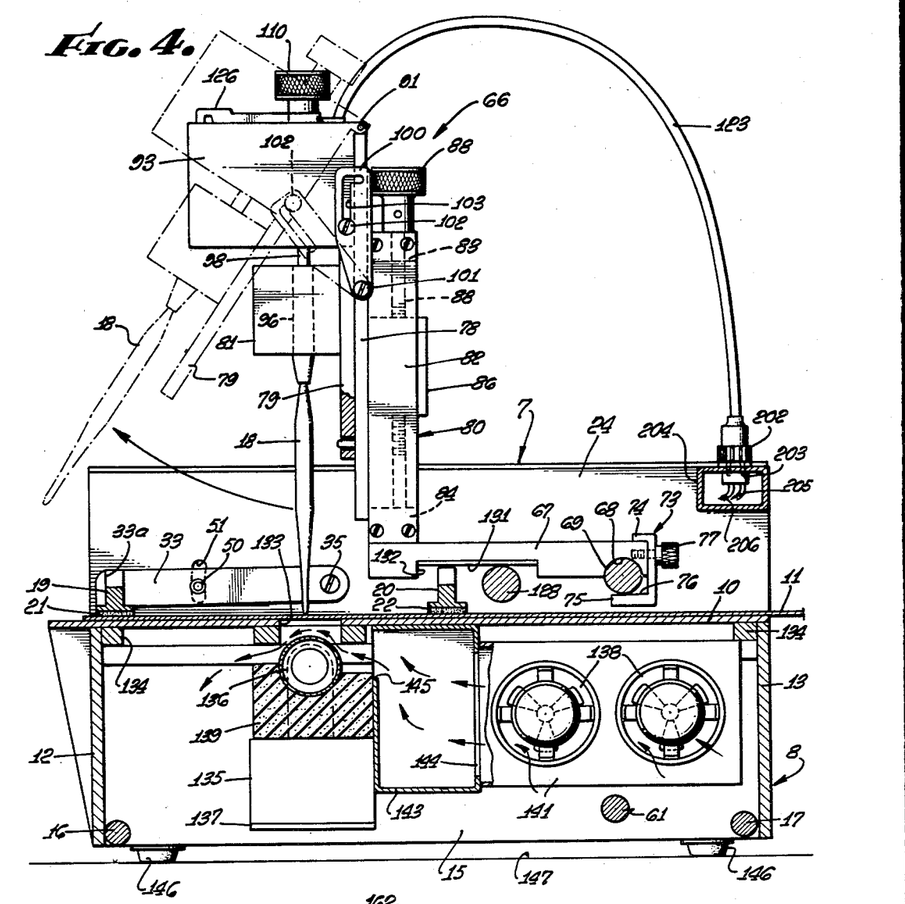
FIG. 4 is an enlarged vertical sectional view taken along a plane corresponding to line 4—4 of FIG. 1.

The clamp bars 19 and 20 are each of inverted T-shaped cross sections, as shown in FIG. 4. Foam or sponge rubber or other suitable cushioning pads 21 and 22 are attached to the under surfaces of the clamp bars in order to provide a firm uniformly distributed frictional engagement with the paper to clamp the same against the table 10.

The clamp bars 19 and 20 are supported and operated by a mechanism housed in the end sections 7 and 9. The left-hand section 7 comprises side panels 23 and 24 (FIGS. 5, 7, and 8) and front and back panels 25 and 26. A two-part cover plate 27, 27a (see also FIG. 2) conceals the mechanism therein. The right-hand frame 9 (FIG. 5 and FIG. 9) comprises side panels 28 and 29, front and back panels 30 and 31 and a cover plate 32. The right side panel 24 of the left-hand section 7 is attached to the left-hand side panel 14 of the central section 8, and the left side panel 28 of the right-hand section is attached to the right side panel 15 of the central section. The side plates of the end sections 7 and 9 extend upwardly beyond the paper table 10.

Figure 5:
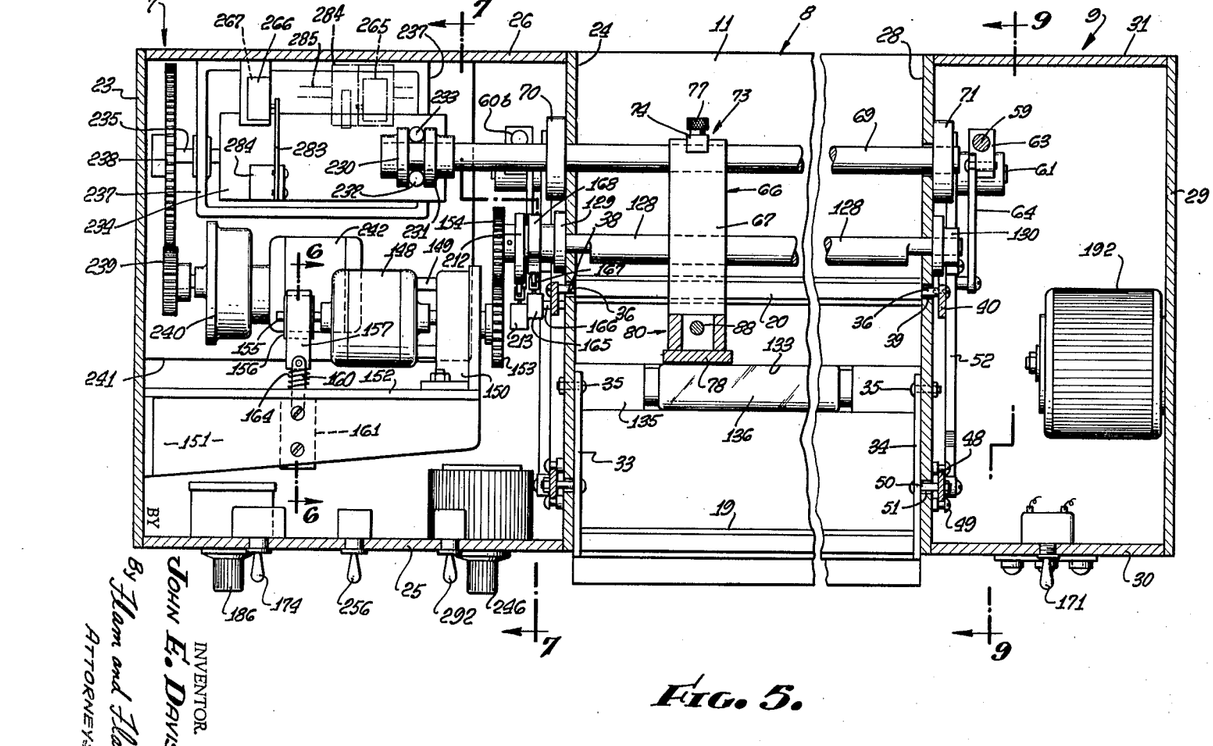
FIG. 5 is an enlarged horizontal sectional view taken along a plane corresponding to line 5—5 of FIG. 1.

The forward clamp bar 19 is supported at opposite ends by pivot arms 33 and 34, as shown in FIG. 5. These pivot arms are attached to and move along the outside surfaces of the inner panels 24 and 28 of the left and right sections 7 and 9. The pivot arms 33 and 34 are mounted upon coaxial pins or screws 35 located rearwardly of the clamp bar 19 and just above the level of the table 10. At the forward end of each pivot arm there is provided a slot 33a (FIG. 4) in which the clamp bar is fitted and secured.

Each end of the rear clamp bar 20 carries two spaced parallel mounting pins 36 and 37 (FIGS. 5 and 9) that project through corresponding clearance apertures 38 (FIG. 5) and 39 (FIG. 9) provided in the panels 24 and 28.

Figure 9:
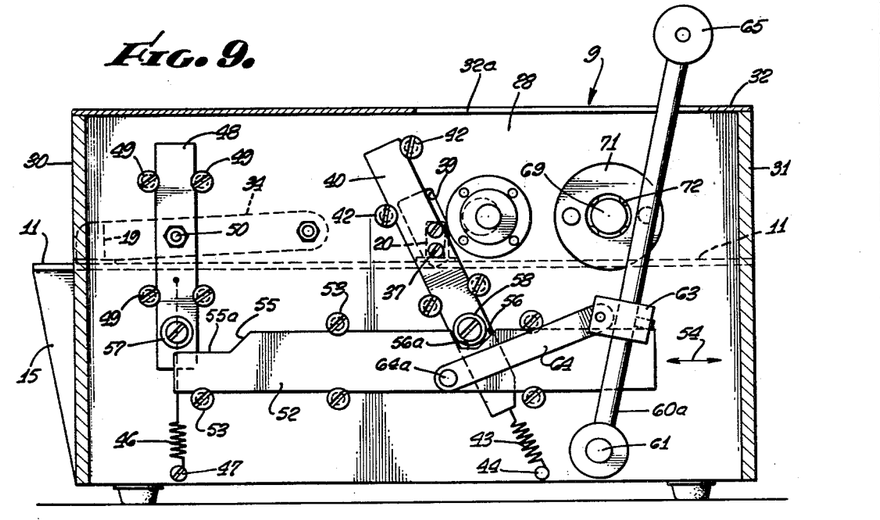
FIG. 9 is an enlarged transverse vertical sectional view taken along a plane corresponding to line 9—9 of FIG. 5.
Figure 10:
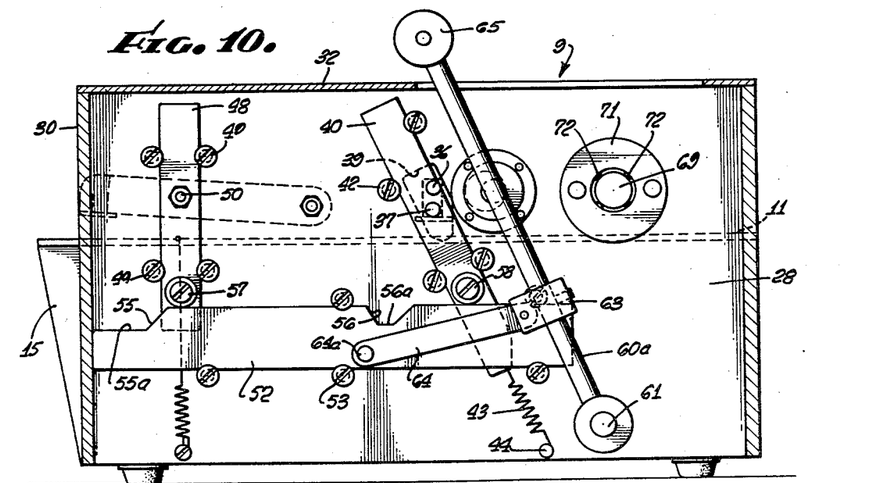
FIG. 10 is a sectional view similar to FIG. 9 but illustrating parts in a different position.

The suspension and actuating mechanisms for the clamp bars 19 and 20 on the insides of the plates 24 and 28 are identical, and except as otherwise indicated, a description of one of the mechanisms will suffice as a description of the other. The mechanism accommodated in the right section 9 is shown in FIGS. 9 and 10.

The mounting pins 36 and 37 are attached to a suspension bar 40 that is oriented in a vertical transverse plane just inside the side panel 28. The suspension bar 40 is in turn guided for rectilinear movement along the panel 28 by the aid of four guide screws 42 attached to the inside of the panel 28. Two of the screws 42 are on one side of the suspension bar 40 and two are on the other side.

A tension spring 43, anchored at a pin 44, pulls the suspension bar 40 generally downwardly between the guide screws 42. As the suspension bar 40 moves downwardly, it also moves rearwardly of the table 10, the guide screws 42 obliquely orienting the suspension bar 40.

The forward clamp bar 19 is pulled downwardly by a tension spring 46 anchored at pin 47 and acting upon a suspension bar 48 for the clamp bar 19. The suspension bar 48 is similar to the suspension bar 40; however, four guide screws 49 vertically orient the suspension bar. A pin 50 (FIG. 5), carried by the suspension bar 48, projects through a clearance slot 51 in the panel 28 for pivotal connection to the pivot arm 34. Accordingly, upon downward movement of the guide bar 48, the pivot arm 34 is moved angularly in a direction to cause the clamp bar 19 to engage the paper on the table 10. The axis of the pivot arm 34 being close to the table 10, the clamp bar 19 engages the paper 11 on table 10 with a substantially vertically applied force.

In order appropriately to move the guide bars 40 and 48 and the clamp bars 19 and 20, a cam bar 52 is provided. This cam bar is mounted by five guide screws 53, also attached to the inside of the side panel 28 so that the cam bar 52 moves horizontally and in a direction indicated by the double headed arrow 54 of FIG. 9. The cam bar 52 is supported in a plane just inwardly of the suspension bars 40 and 48, but opposite ends of the cam bar 52 pass in juxtaposed relationship to the lower ends of the suspension bars 40 and 48.

The cam bar 52 has two cam surfaces 55 and 56 at its upper edge positioned to cooperate with cam rollers 57 and 58, respectively, carried by the guide bars 48 and 40. In the position of FIG. 9, the cam surfaces 55 and 56 are rearwardly removed from the cam rollers 57 and 58, and the cam rollers 57 and 58 are located at relieved portions 55a and 56a of the cam bar 52. Accordingly, under the influence of the respective tension springs 46 and 43, the clamp bars 19 and 20 engage the table 10 or paper 11.

Upon movement of the cam bar 52 forwardly or to the left, as viewed in FIG. 9, the cam surface 56 first engages the cam roller 58 to lift the rear clamp bar 20. After the rear presser bar 20 has been lifted, the cam surface 55 engages the cam roller 57 to lift the front clamp bar 19. In this position, shown in FIG. 10, paper can be removed from or placed upon the table 10.

Upon placement of the paper 11 on the table 10, the cam bar 52 is then moved rearwardly. The roller 57 just moves downwardly and the forward portion of the paper 11 is gripped. Thereafter, the rear clamp bar 20 engages the paper 11 obliquely to impose suitable slight tension thereon to remove any surface irregularities and to conform the paper to the surface configuration of the table 10. To ensure these relationships, the spacing between the operative portions of the cam surfaces 55 and 56 is less than the spacing between the cam rollers 57 and 58.

The structures just described find their symmetrical counterparts in the frame section 7, in supporting and operating the left-hand ends of the clamp bars 19 and 20.

Figure 8:
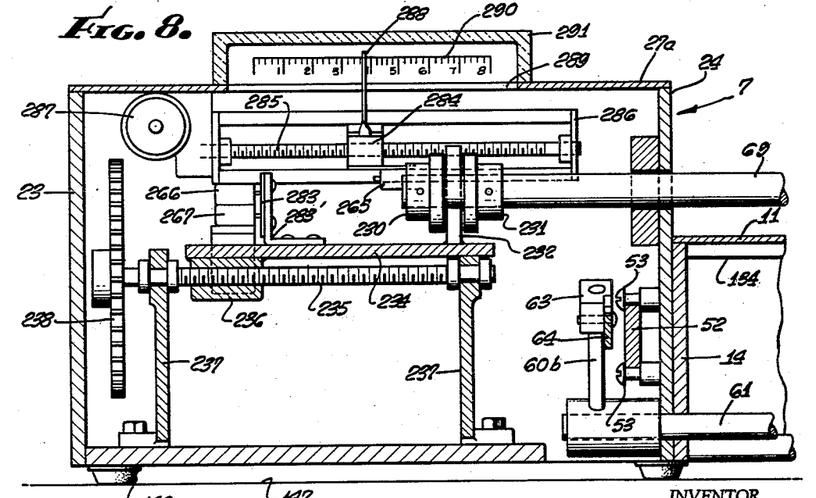
FIG. 8 is a fragmentary longitudinal vertical sectional view taken along the offset plane indicated by line 8—8 of FIG. 7.

In order to move the cam bars 52 at opposite ends in unison, two operating cranks 60a and 60b are provided, as shown in FIGS. 8 and 9, the cranks 60a and 60b being mounted upon a common pivot rod 61. The pivot rod 61 has opposite ends journaled in apertures of the side plate 24 and 28 (see also FIG. 8) and serves as the common link between the mechanisms.

The crank 60a, for example, carries a block 63 that mounts one end of the connecting rod 64. The other end of the connecting rod 64 is attached as by a pin 64a to the cam bar 52. Upon angular movement of the crank 60a, the cam bar 52 is correspondingly moved. A similar linkage is provided for the left-hand mechanism. The crank 60a, for the right-hand mechanism only, extends upwardly through an access opening 32a in the top plate 32. A handle 65 attached thereto serves as a means for manually operating the mechanism in unison.

*Pipette holder, pump, and lifter*

A plurality of holders 66 (FIGS. 1 and 2) are provided for the pipettes 18, whereby a plurality of spots can be deposited upon a single piece of chromatography paper 11. The holders 66 are identical and a description of one will suffice as a description for all.

The holder 66, shown in FIG. 4, serves to position the pipette 18 above the chromatogaphy paper 11, and at a place between the clamp bars 19 and 20. The holder 66 includes a mounting tappet 67 (FIG. 4) provided with a semi-cylindrical recess 68 at one end located on its under surface. A rocker shaft 69 extends along the back of the paper table and at any selected position receives the semi-cylindrical recess 68 of the holder tappet 67. The rocker shaft 69 is supported at opposite ends in the bearings 70 and 71 (FIG. 5) attached to the inner surfaces of the side panels 24 and 28 of the respective frame boxes 7 and 9. Balls 72 (FIG. 9) form the operative bearing elements of the bearing structures 70 and 71, to permit the rocker shaft 69 to move axially as well as angularly about its axis, all for purposes and by means presently to be described.

In order to detachably secure the tappet 67 to the rocker shaft 69, a wedge clamp element 73 (FIG. 4) is provided. The wedge 73 has a generally C-shaped configuration with its upper arm 74 fitted over the rear upper corner of the tappet 67. Its lower arm 75 projects forwardly from a place spaced below the lower rear corner of the tappet to embrace the under surface of the rocker shaft 69. The shaft engaging surface 76 of the arm 75 is sloped forwardly to provide wedging engagement with the rocker shaft 69. In order to achieve such wedging engagement, a knurled thumb screw 77 is provided that projects rearwardly from the tappet, extending through a clearance hole in the clamp element 73. The screw 77 detachably positions and holds the clamp 73 in operative position.

Figures 11, 12, 13:
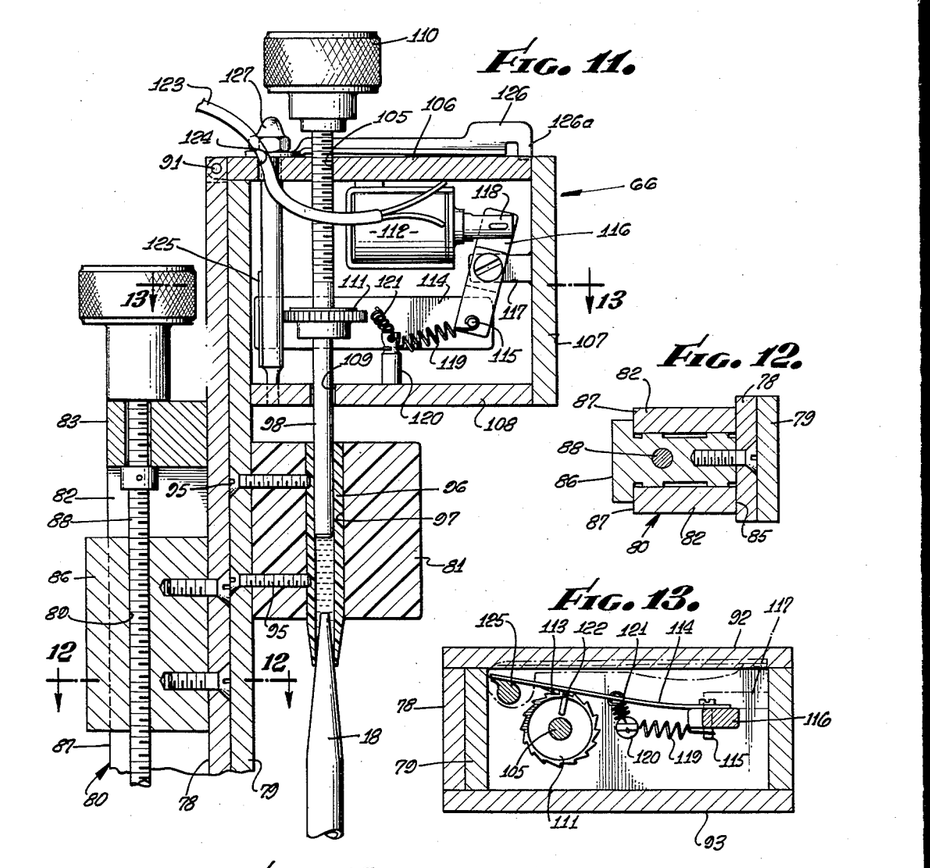
FIG. 11 is an enlarged sectional view of a pipette holder and taken along a plane corresponding to line 11—11 of FIG. 1.
FIGS. 12 and 13 are transverse sectional views taken along planes corresponding to lines 12—12 and 13—13 of FIG. 11.
Figure 14:
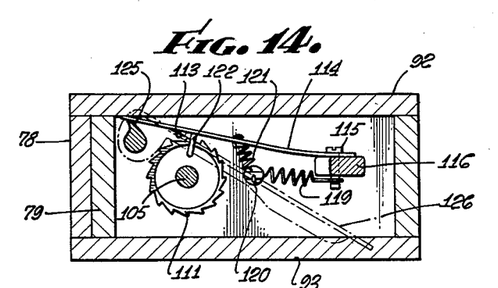
FIG. 14 is a view similar to FIG. 13, but illustrating parts in a different position.

The pipette is adjustably mounted on the tappet in order to allow the pipette to be vertically adjusted and also to allow the pipette to be swung forwardly for introduction of a test solution without disturbing the vertical adjustment. For this purpose, inner and outer hinge plates 78 and 79 (FIGS. 4, 11, and 12) are provided, one of them 78 being mounted for vertical adjustment on a frame 80 extending upwardly from and fastened to the tappet 67, and the other 79 mounting a dispensing cylinder block 81 to which the pipette 18 is frictionally coupled.

The frame 80 (FIGS. 11 and 12) comprises a pair of parallel guide plates 82 oriented in spaced planes transverses to the rocker shaft 69, and top and bottom spacer blocks 83 (FIG. 11) and 84 (FIG. 4). Hinge plate 78 engages the forwardly facing edges 85 of the guide plate 82. A T-shaped head 86 projecting rearwardly of the hinge plate 78 slidingly fits and extends between the guide plates 82, with the flange of the head engaging the rearwardly facing edges 87 of the guide plates 82. The hinge plate 78 is accordingly confined for movement in its plane along the frame 80.

A lead screw 88 is mounted at opposite ends by the spacer blocks 83 and 84 and extends vertically between the guide plates 82 and engages an appropriate threaded opening 89 in the T-head 86 whereby the hinge plate 78 is elevated or lowered relative to the tappet 67.

A hinge pin 91 extends horizontally through the upper end of the hinge plate 78 and has ends received in side plates 92 and 93 attached to opposite edges of the outer hinge plate 79, as shown in FIG. 4.

The cylinder block 81 which is made of transparent plastic or the like, is mounted on the outer hinge plate 79 by the aid of screws 95. A Teflon tube or equivalent tube 96 lines a vertical bore 97 of the block 81. The depending lower end of the tube 96 is accessible for insertion of the tapered end of the pipette tube 18. A frictional coupling is thereby established.

A piston rod 98 extending into the top of the cylinder tube 96 operates to move test solutions into and out of the pipette 18.

In order to fill the cylinder tube 96, the hinge plate 79 is rotated outwardly to the phantom line position of FIG. 4. A beaker or the like can then be placed over the bottom of the pipette. The piston rod 98 is then retracted in a manner to be hereinafter described. After the cylinder tube 96 is filled, the hinge plate 79 swings rearwardly, and the vertically adjusted position of the hinge plates 78 and 79 need not be disturbed.

In order to facilitate the introduction of test solutions when the hinge plate 79 is moved outwardly, and to facilitate placement or removal of the pipette 18, a releasable latch plate 100 is provided to hold the outer hinge plate 79 in the tilted phantom-line position of FIG. 4.

The latch plate 100 has one end pivoted by a pin 101 to one side edge of the inner hinge plate 78. A pin 102, projecting laterally from the corresponding side of the outer hinge plate 93 operates in a slot 103 of the latch plate. The slot 103 extends generally radially of the mounting pin 101, except that its end remote from the mounting pin 101 has a transverse portion that allows the latch plate 100 to move downwardly when the pin 102 reaches this portion. When the pin is so situated, the latch bar 100 acts as a strut holding the hinge plate 79 in its outer position. After the latch is operated, a technician may with one hand hold the beaker containing the test solution, while retracting the piston 98 with the other. The manner in which the piston rod may be retracted will now be described.

The piston rod 98, shown in FIGS. 11–14, is cylindrical at its lower end and screw-threaded at its upper end. The piston rod 98 extends upwardly between the side plates 92 and 93 and threadedly engages an aperture 105 of a cover 106 that extends across the side plates. A front plate 107 and a bottom plate 108 complete an enclosure for parts to be hereinafter described. The pump rod 98 passes through a clearance aperture 109 of the bottom plate 108.

By rotating the piston rod 98, as by the aid of a knurled knob 110 attached to the upper projecting end of the rod, the rod is raised or lowered.

The knob 110 is normally used for drawing liquid into the pipette 18 whereas a metering device is normally used for slowly dispensing the liquid from the pipette 18. For this latter purpose, a ratchet wheel 111 is provided. The ratchet wheel 111 is attached to the rod 98 and is located in the enclosure formed by the plates 106, 107, 108, 93 and 92, and just above the plate 108.

A solenoid 112, attached to the upper plate 106 serves to advance a pawl 113. The pawl 113 is formed on a spring arm 114. The arm 114 has one end pivotally secured by a screw 115 to the lower end of a rocker arm 116. The rocker arm 116 is pivoted upon a post 117 attached to the inside of the front plate 107, and the upper end of the rocker arm 116 is pivotally connected to the plunger 118 of the solenoid 112.

A tension spring 119 mounted on a post 120 projecting from the bottom plate 108 serves to retract the pawl 113 by acting upon the projecting end of the rocker mounted screw 115. A tension spring 121 also mounted on the spring post 120 engages the spring arm 114 to urge the pawl 113 into operative position with respect to the ratchet wheel 111.

A projection 122 formed on the spring arm rests upon the upper surface of the ratchet wheel 111 in order to maintain the appropriate position of the spring arm 114.

A cable 123 extending through a clearance aperture 124 in the top plate 106 carries leads for the solenoid for supplying pulses thereto.

In order to manipulate the knob 110 in a direction to retract the piston rod 98, the ratchet and pawl 111 and 113 must be temporarily disengaged. For this purpose, a cam 125 is provided that is journaled at opposite ends in the top and bottom plates 106 and 108. The cam 125 engages the end of the spring arm 114 and is movable to the position illustrated in FIG. 14 to flex the arm outwardly releasing the ratchet 111 from the pawl 113.

In order to operate the cam 125, a lever 126 is provided that extends along the upper surface of the top plate 106. The lever 126 has one end attached to the projecting upper end of the cam 125. A cap nut 127 suitably maintains the coupling. The frictional engagement of the lever 125 with the top of the top plate 106 releasably holds the cam 125 in the position at which it is placed and against the force imposed thereon by the resilient leaf spring 114. Additionally, a tab 126a may be formed on the lever 125 to engage the edge of the top plate 106 for this purpose.

Capillary flow must be minimized when the pipette 18 touches. In order to minimize the capillary flow, the volume of the cylinder provided by the Teflon tube 96 is deliberately restricted. Only a very slight amount of air is necessarily trapped as liquid is drawn into the cylinder. Accordingly, any capillary flow would induce proportionately large percentage change in the volume of the trapped air, and an effective vacuum opposing capillary flow soon exists. As pulses are supplied to the solenoid 112, the pipette 18 must be periodically retracted to allow at least partial evaporation at the center of the spot.

In order to reciprocate the pipette holder 66, a cam rod 128 (FIGS. 2, 4, and 5) is provided. This cam rod 128 parallels the rocker shaft 69 and is located forwardly thereof, but just behind the rear clamp bar 20. The cam rod 128 is mounted in bearings 129 and 130 (FIG. 5) attached at the inside surfaces of the side panels 24 and 28. The cam shaft or rod 128 engages the under surface of the tappet forwardly of its mounting whereby the tappet 67 and the entire holder 66 is angularly reciprocated about the axis of the rocker shaft 69. A plastic replaceable bearing plate 131 fits a recess 132 at the bottom of the tappet 67 for engagement with the cam shaft 128.

As the cam shaft 128 is reciprocated, the ratchet wheel 111 is driven and, accordingly, the small amounts of fluid are periodically deposited on the chromatography paper 11.

Adjustment of the vertical position of the holder 66 ensures that the end of the pipette 18 delicately and precisely contacts the chromatography paper 11 when the cam shaft 128 is at its low position.

Heating and lighting

In order to assist the drying or evaporation of the deposited material, the paper 11 is heated from below. In order to expose the under surface of the paper 11 along the line of the pipette 18, the table 10 has a longitudinally extending central slit 133 (FIG. 4). Reinforcing bars 134 are provided suitably to support the two sections of the table 10.

An electrical fixture box 135 for a fluorescent illumination tube 136 is supported in the central section 8 beneath the table 10, so as to extend in spaced relationship along the slit 133. Brackets 137 (FIG. 3) for supporting the fixture 135 are attached to the side panels 14 and 15.

In order to provide heated air, blowers 138 are provided (see also FIG. 3) that are attached to a heater box 141 in which a heating element 142 is accommodated. The heating box 142 is in turn attached to the rear wall of a manifold 143. The manifold 143 is generally of rectangular box configuration extending along the entire length of the table 10. The forward wall of the manifold extends from the rear section of the table downwardly to the rear side of the fixture box 135. An opening 144 at the rear wall of the manifold 143 admits heated air from the heater box 141 and the forward wall of the manifold 143 has an elongated upper opening 145 that is located at the level of the fluorescent tube 136. Heated air passes from the manifold and above the tube 136 to the under surface of the paper 11. A felt filler pad 139 closes the space between the fixture box 135 and the tube 136 to ensure passage of heated air in the desired parts.

Air passing forwardly beyond the tube 136 is expelled beneath the lower edges of the various panels of the frame sections, feet 146 elevating the apparatus from its support 147.

Spot motor and controls

The left-hand section 7 incorporates various motive means for the rocker and cam shafts 69 and 128 as well as control elements for operating the liquid pumps.

A motor 148 (FIG. 5) for operating the cam shaft 128 is mounted by posts 149 that project from one side of a gear reduction mechanism 150. The gear reduction mechanism 150 driven by the motor 148 is in turn mounted upon a shelf 152 of a cantilever bracket 151. The bracket is secured to the left side panel 23 of the section 7. The shelf 152 extends in a vertical longitudinally extending plane in spaced relationship to the front panel 25. The gear reduction mechanism 150 drives offset gear elements 153 and 154 respectively connected to the gear reduction shaft and the end of the cam rod 128 that projects into the enclosure formed by section 7.

Figure 6:
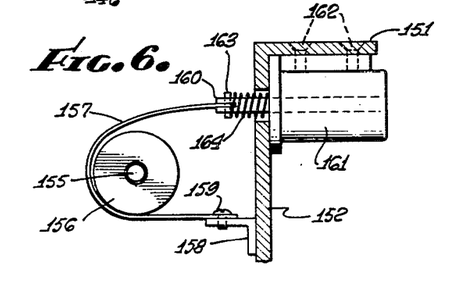
FIG. 6 is an enlarged fragmentary sectional view showing a detail of construction and taken along a plane corresponding to line 6—6 of FIG. 5.

The shaft of the spot motor 148 projects from both ends, and the end remote from the gear mechanism 150 cooperates with the brake structure shown in detail in FIG. 6. This brake makes it possible accurately to stop the cam rod 128 at a desired position for purposes to be hereinafter explained.

A brake drum 156 carried on the shaft 155 cooperates with a brake band 157. The band 157 has one end attached to a bracket 158 carried by the shelf 152. A screw 159 is provided for this purpose. The other end of the band 157 is attached to a plunger 160 of an actuating solenoid 161 also carried by the cantilever bracket 151. Screws 162 are provided for this purpose.

A pin 163 connects the plunger 160 and the band end. A coil spring 164 surrounding the plunger 160 reacts at one end against the solenoid housing and at the other against the ends of the connecting pin 163 for moving the plunger to its normal band releasing position. Upon energization of the solenoid 161, brake band 157 is drawn about the drum 156 and the motor is suitably stopped.

The control circuit for the brake includes a sensing switch 165 (FIGS. 5 and 7) that cooperates with the cam rod 128. This switch 165 maintains the circuit for motor 148 energized until the cam rod 128 is at its low position and then interrupts the motor circuit and applies current to the brake solenoid 161. This prevents any erroneous adjustment of the position of the pipette 18. Thus, when the apparatus is stopped, there is an assurance that the pipette holder 66 is as close to the paper as it will ever be, and fracture of the chromatography paper and fracture of the pipette are both avoided.

The switch 165 is mounted on the side panel 24 as by a post 166. An arm 167 of the switch 165 is positioned at a cam 168 carried upon the cam rod 128 adjacent the bearing for the cam rod. The cam 168 has a relieved portion 169 that allows the arm 167 to move inwardly toward the axis of the cam rod and to open the switch 165 when the cam rod 128 is in its lowermost position.

Figure 15:
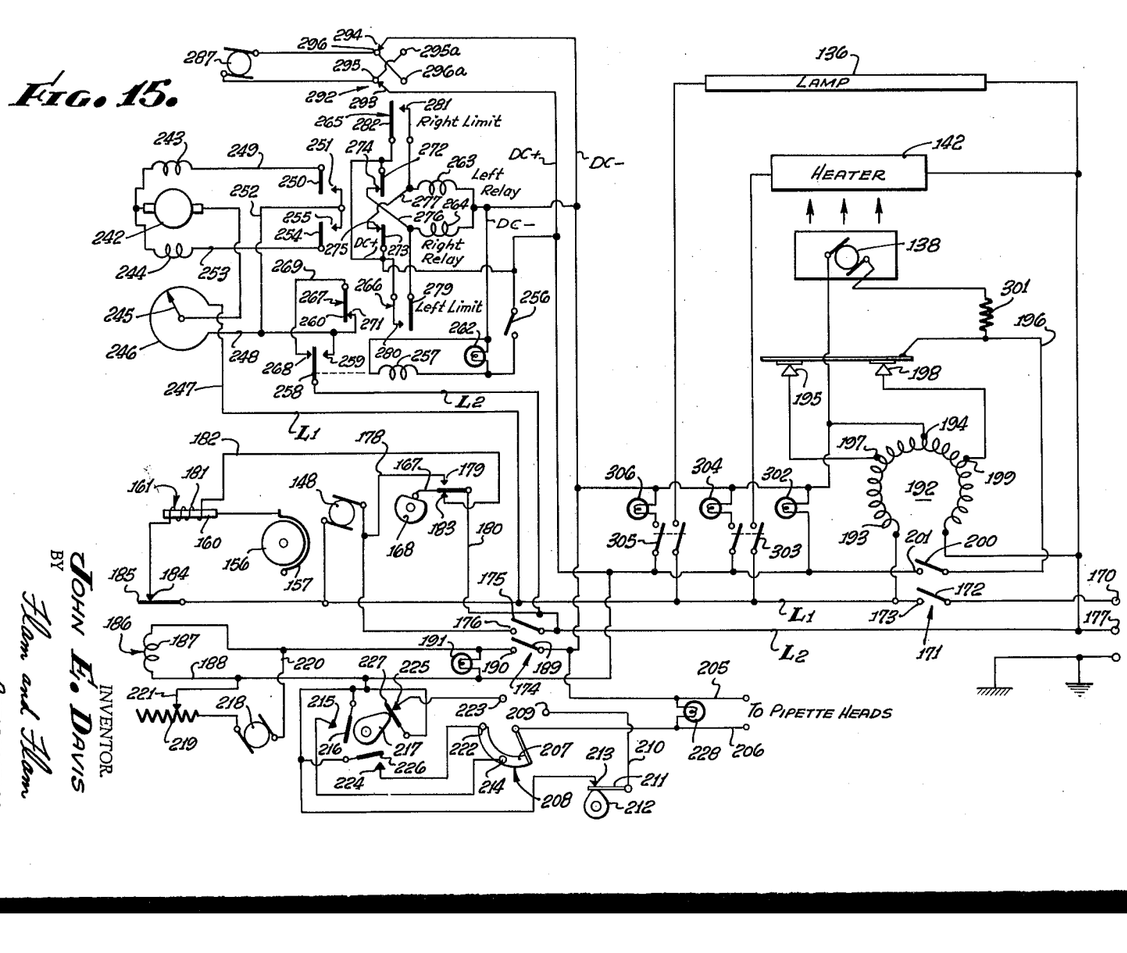
FIG. 15 is a wiring diagram.

The parts just described appear in the circuit diagram of FIG. 15. One side of the spot motor 148 (see lower left-hand portion of FIG. 15) is connected to a switched A.C. supply line $L_1$. Thus, the line $L_1$ connects with a contact 173 engaged by an arm 172 of a main power switch 171. The arm 172 is in turn connected to a supply terminal 170. The main switch 171 is located at the front panel 30 (FIG. 5) of the right-hand section 9. The other side of the spot motor 148 is connected to a contact 176 (FIG. 15) engaged by a switch arm 175 of a spot switch 174. The arm 175 is in turn connected to an unswitched A.C. supply line $L_2$ and a second supply terminal 177.

A holding circuit controlled by the cam 168 parallels the spot switch 174 to maintain the motor circuit despite opening of the spot switch 174 until the relieved portion 169 of the cam is operative. Thus, a lead 178 connects the spot switch contact 176 and a contact 179, and a lead 180 connects the spot switch arm 175 to the holding switch arm 167. The holding switch arm 167 is caused to engage the contact 179 whenever the cam rod is away from its low point.

The brake solenoid 161 has a coil 181, one side of which is connected to the A.C. supply line $L_2$ via a lead 182 and a contact 183 engaged by the arm 167 of the holding switch 165 when the cam rod is at its low position. The other side of the solenoid coil 181 connects via a back relay contact 184 and a relay arm 185 directly to the line $L_1$. The energization circuit for the solenoid coil 181 can be completed only when the cam rod reaches its low position. As soon as the spot motor switch 174 is operated, the brake must be released quite apart from the engagement of contact 183. It is for this purpose that a relay 186 is provided.

The relay 186 has a coil 187 that pulls the arm 185 away from the back contact 184, immediately upon closure of the spot motor switch 174. Thus, energy for the relay coil 187 is derived from direct current supply lines D.C.+ and D.C.— that are operative on closure of the main switch 171. One side of the relay coil 187 directly connects as by a lead 188 to the supply line D.C.+. The other side of the coil 187 connects to the supply line D.C.— in dependence upon closure of the spot motor switch 174. For this purpose, the switch 174 has a second switch arm 189 cooperable with a contact 190.

A pilot lamp 191 (see also FIG. 1) is also energized from the supply lines D.C.+ and D.C.— upon closure of the switch 174 to indicate operation of the spot motor. For this purpose, one side of the pilot lamp 191 connects to the contact 190 and via switch 174 to the line D.C.—, and the other side of the lamp connects directly to the lead D.C.+.

Power supply

A simple power supply structure accommodated in the right-hand box 9 is provided for exciting the supply lines D.C.+ and D.C.—. A transformer 192 has opposite ends connected to the switch controlled A.C. supply lines $L_1$ and $L_2$. The transformer provides a central tap 194 to which the lead D.C.— is connected. One rectifier 195 joins a transformer terminal 197 on one side of the center tap 194 to a lead 196, and a second rectifier 198 joins a transformer terminal 199 on the other side of the center tap 194 and the said lead 196. The rectifiers 195 and 198 operate alternately to provide positive pulses to the lead 196. The lead 196 connects to the lead D.C.+ via a second switch arm 200 of the power switch 171. The switch arm 200 thus engages a contact 201 connected to the lead D.C.+. Accordingly, upon closure of the main switch 171, the power supply structure is operated and the supply lines D.C.+ and D.C.— are excited.

A pigtail, not illustrated, extends from the right-hand box 9 for connection to an A.C. supply. The transformer 192 is illustrated in FIG. 5 as being attached to the outer side panel 29 of the box. The D.C.+ and D.C.— leads, as well as leads $L_1$ and $L_2$, are dressed in any suitable manner to the left-hand section 7, as by passage beneath the paper table 10.

Dispensing controls

The pipette solenoids 112 (FIG. 11) of the various holders 66 are simultaneously supplied with pulses from the supply lines D.C.+ and D.C.—. The leads 123 (FIGS. 4 and 11) from the holders terminate at prong connectors 202 cooperable with sockets 203 supported by a tubular bar 204. The tubular bar 204 extends above the rear end of the paper table 10, and has opposite ends attached respectively to the side panels 24 and 28 of the left and right boxes respectively. Leads 205 and 206 extend through the tubular bar 204 from the sockets 203 to the left-hand frame section 7. One of these leads 205 as diagrammatically indicated in FIG. 15, is connected to the lead D.C.—. The other lead 206 extends to a wiper arm 207 of a selector switch 208 mounted upon the front panel of the box 7. The selector switch arm 207 connects with the other supply lead D.C.— via any one of four parallel paths. One of these paths is established when the arm 207 is in one contacting position at which the arm engages only its contact 209. A lead 210 from contact 209 extends to a switch arm 211 reciprocated by a cam 212 connected to the cam rod 128 (see also FIG. 5). Once every revolution of the cam rod 128, the cam 212 causes the arm 211 to engage a contact 213, which connects to the line D.C.+. A pulse is thus applied to the ratchet operating solenoid 112. Accordingly, the contents of the tube or container 96 are discharged throughout a course of time spanning a large number of cycles of the cam rod 128.

The three other contacts of the selector switch 208 allow control of the ratchet solenoid 112 independently of the operation of the cam rod 128. When the selector switch is in a second position, the arm 207 engages only the contact 214. The contact 214 connects to a contact 215 engaged by an arm 216 in turn operated by cam 217. The arm 216 connects directly to the lead D.C.+. A pipette motor 218 turns the cam 217, and once every revolution of the pipette motor 218, a pulse is applied to the solenoid 112.

For purposes of speed control of the pipette motor 218, and frequency control of solenoid 112, a variable resistor 219 (see also FIG. 1) is inserted in the energization circuit for motor 218. One lead 220 from the motor connects via the spot motor switch 174 to D.C.—, and the other lead is connected via the series resistor 219 and a lead 221 to D.C.+. Whenever the spot motor 148 is operated, the pipette motor 218 is likewise operated, and the speed determined by the setting of the potentiometer 220.

In order to increase the range frequency adjustment, the switch 208 has two additional contacting positions in which the cam 217 completes two and three circuits per revolution for application of a pulse to the pipette solenoid 112. Contacts 222 and 223 of selector switch 208 are connected to contacts 224 and 225 which are engaged by arms 226 and 227 operated by cam 217. The arms 226 and 227 are located in angularly spaced relationship with respect to the arm 216 (see also FIG. 7), and like arm 216, are connected to D.C.+.

In the full-line position of selector switch 208 illustrated, the wiper arm 207 engages contacts 214 and 222. Hence, pulses are applied at the rate of two each revolution of cam 217, two of the three cam switches being operable. The wiper arm 207 is movable to engage all three contacts 214, 222, and 223 to provide three pulses each revolution.

A pilot light 228 (see also FIG. 1) is connected across the pipette leads 205 and 206 in order visually to indicate the pulses as they are applied.

The switch structures cooperable with the cam 217 are mounted on L-bracket 229 (FIG. 7) that depends from the cantilever bracket 151.

Stripe motor and controls

Figure 7:
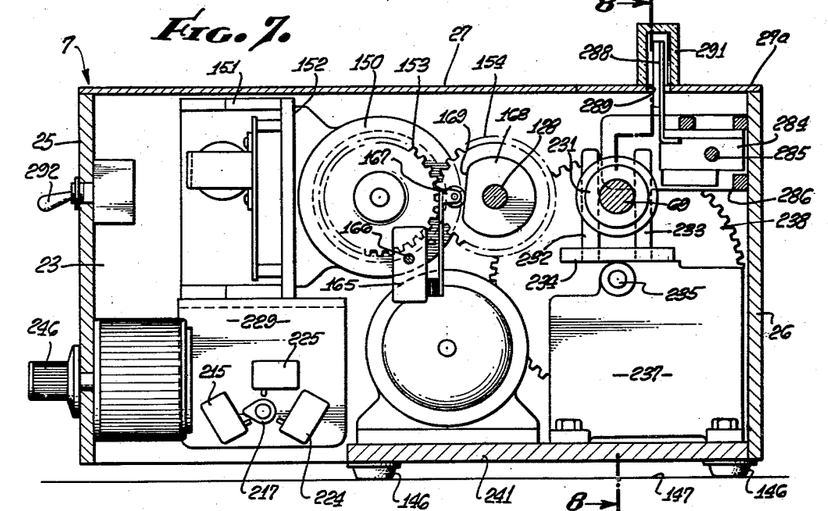
FIG. 7 is a further enlarged transverse vertical sectional view taken along a plane corresponding to line 7—7 of FIG. 5.

In order to provide a stripe on the chromatography paper 11, the rocker shaft 69 upon which the holder 66 is mounted may be caused axially to reciprocate. Thus, spots are applied along a line, and a stripe is accordingly provided. The mechanism for this purpose is located at the back of the left-hand section 7 and as shown in FIGS. 7 and 8.

The end of the rocker shaft 69, as shown in FIG. 8, carries two collars 230 and 231. Entering between these two collars 230 and 231 and on opposite sides of the shaft 69 are two pins 232 and 233 that project upwardly from a carriage 234. The carriage 234 is guided for movement in a path paralleling the axis of the rocker shaft 69 by aid of a lead screw 235 cooperable with a traverse block 236 extending below the carriage 234.

The lead screw 235 has ends journaled in two bearing plates 237 located at the lower rear corner of the section 7. The left-hand end of the lead screw 235 projecting beyond one of the plates 237 carries a spur gear 238 by the aid of which the lead screw 235 is operated. As shown in FIG. 5, the spur gear 238 engages a gear 239 mounted on the output shaft of a gear reduction mechanism 240.

The gear reduction mechanism 240 is mounted upon a base plate 241 (FIG. 7) that supports the bearing plates 237, the base plate extending inwardly from the rear wall 26 of the box 21. A stripe motor 242 similar to the spot motor 148 is carried by gear reduction mechanism 240 for reciprocating the rocker shaft upon which the holders 66 are mounted.

The upwardly extending pins 232 and 233 have a running fit with respect to the collars 230 and 231 whereby the rocker shaft 69 can be angularly moved without interference with the axial coupling effected between the parts.

As shown in FIG. 15, the stripe motor 242 has two series field coils 243 and 244 whereby the direction of motion can be reversed suitably to reciprocate the rocker shaft 69. In addition, the speed of the motor 242 is controlled by varying its excitation. For this purpose, an autotransformer is provided.

The autotransformer 246 has one lead 247 connected directly to the line $L_1$ and its other lead 248 connected alternately via one of two switches, presently to be described, to the line $L_2$. One of the armature terminals of the motor 242 connects to a sliding tap 245 of the autotransformer. The other terminals of the motor 242 extends to the lead 248 and line $L_2$ via one of the two coils 243 or 244.

Thus, one end of coil 243 is connected to the armature terminal and the other end connects via lead 249 to a switch arm 250 and front contact 251 of one switching relay to a lead 252, the transformer lead 248. The other coil 244 has one end connected to the armature terminal and the other end connected via a lead 253 to switch arm 254 and a front contact 255 of a second switching relay to the leads 252, and transformer lead 248.

When a switch 256 is closed, the autotransformer 246 is energized to provide excitation for the stripe motor 242. A power relay 257 is provided for this purpose. The relay 257 has one side connected directly to D.C.— and its other side connected via stripe switch 256 to D.C.+. The power relay has an arm 258 connected to line L₂ that engages a front contact 259 that is common to the transformer lead 248. Thus, a power circuit is completed for the autotransformer, its other lead 247 directly connecting to line L₁. A pilot lamp 262 connected across the coil 257 indicates that power is supplied to the stripe motor 242.

Left and right switching relays 263 and 264 respectfully associated with the arms 250 and 254 determine the direction of the motor 242. The relays 263 and 264 are governed by two normally open limit switches 265 and 266. When left relay 263 is operated, the motor is conditioned for movement to the left, and when right relay 264 is operated, the motor is conditioned for movement to the right. In a manner hereinafter to be described, the limit switch 266 is closed when rocker shaft 69 reaches a left-hand limit, and the switch 265 is closed when the rocker shaft reaches a right-hand limit. It is intended that the operation of the stripe motor 242 be continued despite deenergization of the power relay 257 until the rocker shaft 69 reaches one limit, in this instance, its left-hand limit. Accordingly, for setting up a run, the technician knows that the holders 66 will traverse to the right.

A normally closed holding switch 267 accordingly completes a circuit for the autotransformer lead 248 immediately upon de-energization of the power relay 257. The switch arm 258 thus engages a back contact 268 that, by the aid of a lead 269, connects to a switch arm 260 of holding switch 267, the contact 271 of which is connected to the autotransformer lead 248. Accordingly, unless holding switch 267 is opened, the transformer lead 248 continues its connection to line L₂ via holding switch 267 and back contact 268 of the power relay. The switch arm 260 is opened when the rocker shaft 69 reaches its left-hand limit, and the motor 242 is stopped.

The limit switches 265 and 266 and the left and right relays 263 and 264 will now be described.

Assuming that the mechanism is at rest, the rocker shaft 69 is at its left hand limit, switch 266 is closed, and switch 265 is then open. The limit switches 265 and 266 provide main energization circuits for the respective relays 263 and 264. Thus, the switch arm 282 of right limit switch 265 and contact 280 of the left limit switch 266 are connected together and to the lead D.C.+.

The contact 281 of the right limit switch is connected to one side of the left relay 263, and the other side of the left relay 263 is directly connected to lead D.C.—. Thus, the main energization circuit for left relay 263 is inoperative.

The arm 279 of the left limit switch is connected to one side of the right relay 264, and the other side of the right relay is directly connected to lead D.C.—. Thus, the main energization circuit for the right relay is operative.

Holding circuits for the left and right relays are dependent upon the opposite relays being deenergized. Thus, a holding switch arm 272 and a back contact 274 of the left relay are respectively connected to elements of the left-hand limit switch 266. A holding switch arm 273 and a back contact 275 of the right relay 264 are respectively connected to elements of the right limit switch 265.

Since right relay 264 is operative by virtue of closure of the left limit switch 266, the holding circuit for left relay 263 is inoperative, and since left relay 263 is deenergized, the holding circuit for right relay is operative.

Accordingly, upon closure of stripe switch 256, the motor 242 begins movement to the right. The left limit switch 266 opens, but the holding circuit for the right relay is operative and the shaft 69 is traversed to the right. A circuit for the right relay 264 may be traced as follows: D.C.—, relay 264, lead 276, holding contact 274 and arm 272, to D.C.+. After a predetermined movement, the right limit switch 265 is closed, the left relay 263 is energized, the holding circuit for the right relay is interrupted, and a holding circuit is now effective for left relay 263. A circuit for the left relay 263 may be traced as follows: D.C.—, relay 263, lead 277, holding contact 275, arm 273 to D.C.+. The motor 242 reverses and symmetrical operations result when the left limit switch is engaged causing the motor to reverse again.

Traversing continues until the stripe switch 256 is opened. When so opened, the circuits for relays 263 and 264 are unaffected, and operation continues until the holding switch 267 is engaged when the rocker shaft 69 reaches the left limit.

The left limit switch 266 and the holding switch 267 appear in FIGS. 5 and 8. These switches are mounted one above the other on the rear panel 26, and are so positioned as to be simultaneously engaged by a spring arm 283 that traverses with the carriage 234. For this purpose, a bracket 283' (FIG. 8) is provided.

The right limit switch 265 is mounted upon a traverse block 284 (FIG. 8) cooperable with a lead screw 285 that parallels the rocker shaft 69. The lead screw 285 is mounted on a frame 286 attached to the rear panel 26 above the carriage 234. The lead screw is rotated by the aid of a small reversible motor 287 attached to one end of the frame 286.

Depending upon the position of the traverse block 284 along the lead screw 285, the rocker shaft 69 travels more or less before reversing. Thus, if the block 284 is to the far right and distant left limit from switch 266, the rocker shaft 69, carriage 234, and spring arm 283 must move substantially to the right before the right limit switch 265 is engaged; whereas, if the block 284 is close to left limit switch 266, the parts move to a lesser extent before the right limit switch 265 is engaged.

An indicator 288 projecting upwardly from the traverse block 284 passes upwardly through a clearance slot 289 in the top plate of the section 7 and cooperates with a scale 290. The scale 290 is carried by a bracket 291 (see also FIG. 7) of translucent material that overlies and closes the slot 289.

The position of the right limit switch and the travel of the rocker shaft is thus visually indicated.

In order to facilitate access to the interior of the box 291, the top plate 27 is made in two parts, as shown in FIG. 2, the rear part mounting the scale bracket 291.

The motor 287 is controlled by a double throw double pole centrally spring biased reversing switch 292 (see FIGS. 1 and 15). This switch has arms 293 and 294 respectively connected to supply lines D.C.+ and D.C.—. One of the arms 293 cooperates with contacts 295 and 296a respectively connected to terminals of the motor 287, and the other arm cooperates with contacts 296 and 295a respectively connected to the terminals of the motor, the contacts 295 and 295a being common, and contacts 296 and 296a being common. The polarity of the source as applied to the motor 286 is determined by the position of the switch 292. By operating the switch, the traverse of the rocker shaft is determined.

*Power circuits*

Suitable circuits are provided for the blowers 140, the heating coil 142, and the fluoroescent lamp 136, as shown in FIG. 15.

The blower motors 138 are indicated as a unit. One side is connected to D.C.—. The other side connects via a speed reducing resistor 301 to the lead 196 which is common to D.C.+ via the main switch 171. An indicating lamp 302 connected across the lines D.C.+ and D.C.— indicates that the main power and the blower are on.

A double pole switch 303 controls the heating unit 142 and the pilot lamp 304 that indicates its operation. One element of the double pole switch 303 connects one side of the heating element 142 to the supply line L₁, the other side of the heating element being directly connected to $L_2$. The other element of the switch 303 connects the pilot lamp 304 across the D.C. lines D.C.+ and D.C.—. A double pole switch 305 similar to the switch 303, similarly connects the fluorescent lamp 136 to the A.C. supply lines $L_1$ and $L_2$ and also simultaneously connects the pilot lamp 306 to the lines D.C.+ and D.C.—. The lamps and the switches appear in FIG. 1.

*Procedure*

(1) Approximately ten to fifteen minutes prior to use, the main power switch 171 is closed and the heating unit 142 is turned on if heat is to be used in drying.

(2) The chromatography paper 11 marked for application of spots or stripes is placed beneath clamp bars 19 and 20.

(3) Pipette holders 66 corresponding to the number of spots or stripes are then positioned along the rocker shaft 69 and clamped in place, the hinge plates 78 and 79 (FIG. 4) being raised by lead screw 80. The prong connectors 202 are inserted in sockets 203.

(4) The hinge plates 79 are moved outwardly, and pipettes are inserted into the tubes 96, preferably with a slight rotating action.

(5) The hinge plates 79 are returned to position, and the pipette heights are adjusted so that the tips just touch the upper surface of the paper 11. Adjustments in the positions of the holders 66 are now made to ensure that the pipettes are on the marks for spots or at the left of the marks for stripes.

(6) The traverse of the rocker shaft 69 is adjusted and tested by operating switches 256 and 294 if stripes are to be provided.

(7) The plates 79 are again rotated outwardly and latched. The pawl releasing levers are operated. With the sample in position, each pipette is filled by manipulating the knobs 110. The hinge plates 79 are then returned.

(8) If spots are to be made, only the spot switch 174 is turned on. If stripes are to be made, the stripe switch 256 is also turned on.

(9) The flow rate of the sample is determined by the selector switch 208, and if in any of its three range selecting positions, then the potentiometer 219 is also adjusted.

(10) After the samples have been deposited, the spots or stripes are completed, and the paper is removed for further processing.

The inventor claims:

1. In apparatus for depositing test solution upon chromatography paper or the like: a means forming a bed for chromatography paper or the like; a first clamp member and a second clamp member each engageable with the bed at spaced positions therealong; means supporting the clamp members for movement in paths diverging from each other as the clamp members engage the bed; resilient compressible pads carried by the clamp members for providing a friction grip upon chromatography paper placed on the bed for ensuring the tensioning of said paper; and releasable means movable to elevate the clamp members for placement and removal of the paper.

2. In apparatus for depositing test solution upon chromatography paper or the like: a flat table forming a bed for chromatography paper or the like; a pair of parallel clamp bars each having friction gripping means engageable with the table or paper placed thereon at spaced positions therealong; first suspension means guiding one of the clamp bars for movement in a direction substantially perpendicular to the bed; second suspension means guiding the other of the clamp bars for movement in a direction substantially oblique to the bed, and diverging from the direction of movement of the first clamp bar as the clamp bars engage the bed; yielding spring means urging the clamp bars to engage the bed; and a cam operating mechanism for raising the clamp bars in sequence and for lowering the clamp bars in reverse sequence so as to impose a tension on the paper between the clamp bars, said cam operating mechanism including a cam element so arranged as to cause the one of said clamp bars to be the first to be engaged and the last to disengage.

3. In apparatus for depositing test solution upon chromatography paper or the like: means forming a bed for chromatography paper or the like; a plurality of holders for solution containers having egress openings; means mounting the holders for reciprocating movement toward and away from the paper bed; and dispensing means carried by the holders for slowly expressing solution from the containers carried by the holders, and during a course of time spanning a number of cycles of said reciprocating movement.

4. In apparatus for depositing test solution upon chromatography paper or the like: means forming a bed for chromatography paper or the like; a plurality of holders for solution containers having egress openings; a rocker shaft extending parallel to said bed and supported for reciprocating angular movement about its axis; means securing the holders to the rocker shaft at individually selected positions therealong; a cam shaft paralleling the bed and forming a rest for the holders; motive means for the cam shaft for reciprocating the holders toward and away from the bed; and dispensing means for slowing expressing solution from the containers carried by the holders, and during a course of time spanning a number of cycles of said reciprocating movement.

5. The combination as set forth in claim 4 in which said holders include an adjustable part for moving the containers closer to or farther from the bed; and control means operatively associated with the motive means for causing the cam shaft to stop only at its low position.

6. In apparatus for depositing test solution upon chromatography paper or the like: means forming a bed for chromatography paper or the like; a plurality of holders for solution containers having egress openings; means mounting the holders for reciprocating movement toward and away from the paper bed and for simultaneous reciprocating movement parallel to the bed; first means for imparting reciprocating movement of the holders toward and away from the paper bed at one rate; second means for imparting reciprocating movement of the holders parallel to the bed at another rate; and dispensing means carried by the holders for slowly expressing solution from the containers carried by the holders.

7. In apparatus for depositing test solution upon chromatography paper or the like: means forming a bed for chromatography paper or the like; a plurality of holders for solution containers having egress openings; means mounting the holders for reciprocating movement toward and away from the paper bed and for simultaneous reciprocating movement parallel to the bed; first means for imparting reciprocating movement of the holders toward and away from the paper bed at one rate; second means for imparting reciprocating movement of the holders parallel to the bed at another rate; dispensing means for periodically expressing metered quantities of solution from the containers carried by the holders; and timing means correlating the dispensing means and the means reciprocating the holders toward and away from the bed.

8. In apparatus for depositing test solution upon chromatography paper or the like: means forming a bed for chromatography paper or the like; a rocker shaft extending parallel to the bed; a plurality of holders for solution containers having egress openings; said holders being individually mounted on the rocker shaft and in side-by-side relationship; bearing means supporting the rocker shaft for angular and axial movement; a cam shaft paralleling the bed and forming a rest for the holders; motive means for the cam shaft; motive means for axially reciprocating said rocker shaft at a rate different from that of the cam shaft; and dispensing means for slowly expressing solution from the containers carried by the holders.

9. The combination as set forth in claim 8 in which said holders include an adjustable part for moving the containers closer to or farther from the bed; control means operatively associated with the motive means for causing the cam shaft to stop only at its low position and the rocker shaft at one limit of axial movement.

10. The combination as set forth in claim 8 together with adjustable control means for determining the length of the path of axially reciprocating movement of said rocker shaft.

11. The combination as set forth in claim 8 in which said dispensing means operates at spaced intervals to express metered quantities of solution; and timing means correlating the dispensing means and the motive means for said cam shaft.

12. The combination as set forth in claim 8 together with a pair of adjustably spaced limit switches; an operating member traversing with the rocker shaft for engaging the limit switches; and control means responsive to operation of the limit switches for reversing the motive means for said rocker shaft.

13. The combination as set forth in claim 12 together with an indicator for visually ascertaining the spacing of said limit switches.

14. The combination as set forth in claim 8 in which said dispensing means operates at spaced time intervals to express quantities of solution; and means operable independently of the motive means for adjusting the said time intervals.

15. In apparatus for depositing test solution upon chromatography paper or the like: means forming a bed for chromatography paper or the like; a plurality of holders for solution containers having egress openings; means mounting the holders for reciprocating movement toward and away from the paper bed; a cylinder mounted on each holder registering with a pipette forming the container held by the corresponding holder; a pump rod for each cylinder; and motive means mounted on each holder for moving the corresponding pump rod.

16. In apparatus for depositing test solution upon chromatography paper or the like: means forming a bed for chromatography paper or the like; a plurality of holders for solution containers having egress openings; means mounting the holders for reciprocating movement toward and away from the paper bed; a cylinder registering with a pipette forming the container held by said holder; a pump rod in the cylinder; a ratchet wheel carried by the pump rod; screw threaded means for advancing the pump rod upon angular movement thereof; a pawl for the ratchet wheel; and an electromagnetic means for recprocating the pawl.

17. The combination as set forth in claim 16 together with circuit means for applying pulses to said electromagnetic means a constant number of times for each reciprocation of said holder.

18. The combination as set forth in claim 16 together with circuit means for applying pulses to said electromagnetic means a constant number of times for each reciprocation of said holder; circuit means for applying pulses to said electromagnetic means at an adjustable rate independent of the reciprocation of said holder; and selector means for alternately determining the operation of said circuit means.

19. The combination as set forth in claim 16 together with means for releasing said pawl for retracting movement of said piston rod by manual rotation thereof.

20. In apparatus for depositing test solution upon chromatography paper or the like: means forming a bed for chromatography paper or the like; a plurality of holders for solution containers having egress openings; means mounting the holders for reciprocating movement toward and away from the paper bed; a cylinder registering with a pipette forming the container held by said holder; a pump rod in the cylinder; means for moving the pump rod; said cylinder having a limited volume whereby capillary flow is opposed by a substantial vacuum.

21. In apparatus for depositing test solution upon chromatography paper or the like: a support forming a bed for chromatography paper, and having an opening; means clamping chromatography paper to the bed and over the opening; a holder for supporting a container in alignment with said support and on one side of the paper; and means for passing heated air toward the opening from the other side of said paper.

22. In apparatus for depositing test solution upon chromatography paper or the like: a table forming a flat bed for chromatography paper, and having an elongated slot; means clamping the chromatography paper on the bed and over the slot; a plurality of holders for supporting dispensing containers above the paper and in alignment with the slot; a lighting tube extending in spaced relationship beneath and along the slot; and means for passing heated air between the tube and the slot.

23. In apparatus for depositing test solution upon chromatography paper or the like: means forming a bed for chromatography paper or the like; means forming a container for solution to be deposited, and having an egress opening; a holder for the container forming means; dispensing means for slowly expressing solution from the egress opening of the container; and means mounting the holders for reciprocating movement toward and away from the paper bed so that the egress opening at one limit of movement closely approaches the paper bed for contact between the solution adhered at said opening and the paper of said bed.

24. The combination as set forth in claim 23 together with a pipette held by the holder to form at least a part of said container, one end of the pipette providing said egress opening.

25. The combination as set forth in claim 24 together with means for adjusting the holder to determine the minimum clearance between the one end of said pipette and the bed.

26. The combination as set forth in claim 23 in which said container has a restricted volume to trap a minimum quantity of air whereby atmospheric pressure opposes capillary flow to the chromatography paper.

27. In apparatus for depositing test solution upon chromatography paper or the like: means forming a bed for chromatography paper or the like; means forming a container for solution to be deposited, and having an egress opening; a holder for the container forming means; dispensing means for slowly expressing solution from the egress opening of the container; means mounting the holders for reciprocating movement toward and away from the paper bed so that the egress opening at one limit of movement closely approaches the paper bed for contact between the solution adhered at said opening and the paper of said bed, and for reciprocating movement parallel to the bed; and means for imparting the said reciprocating movements respectively at different rates.

28. In apparatus for depositing test solution upon chromatography paper or the like: means forming a bed for chromatography paper or the like; means forming a container for solution to be deposited, and having an egress opening; a holder for the container forming means; dispensing means for slowly expressing solution from the egress opening of the container; means mounting the holders for reciprocating movement toward and away from the paper bed so that the egress opening at one limit of movement closely approaches the paper bed for contact between the solution adhered at said opening and the paper of said bed, and for reciprocating movement parallel to the bed; and separately adjustable means for imparting the said reciprocating movements respectively at different selected rates.

29. In apparatus for depositing test solution upon chromatography paper or the like: means forming a bed for chromatography paper or the like; means forming a container for solution to be deposited, and having an egress opening; a holder for the container forming means; dispensing means for slowly expressing solution from the egress opening of the container; means mounting the holders for reciprocating movement toward and away from the paper bed so that the egress opening at one limit of movement closely approaches the paper bed for contact between the solution adhered at said opening and the paper of said bed, and for reciprocating movement parallel to the bed; means for imparting the said reciprocating movements respectively at different rates; and means for selectively determining the amplitude of the said reciprocating movement in a direction parallel to said bed.

30. In apparatus for depositing test solution upon chromatography paper or the like: means forming a bed for chromatography paper or the like; a plurality of holders for solution containers having egress openings; means mounting the holders for reciprocating movement toward and away from the paper bed; a cylinder mounted on each holder registering with a pipette forming the container held by the corresponding holder; a pump rod for each cylinder; electrically actuated motive means mounted on each holder for moving the corresponding pump rod; and means remote from the holders for applying electrical energy to said motive means.

31. In apparatus for depositing test solution upon chromatography paper or the like: means forming a bed for chromatography paper or the like; a two-part holder; means mounting one part of the holder for reciprocating movement toward and away from the paper bed; means mounting the second part of the holder on the first part for movement in a path fixed with respect to the first part; reservoir means mounted on the second part for containing solution to be deposited; a pipette having one end communicating with and attached to the reservoir; means for expressing solution from said reservoir at a metered rate; means determining a first relative position of the holder parts in which the pipette approaches and recedes from the paper bed as the holder is reciprocated; said second holder part being movable to another position relative to said first holder part for access to the pipette end.

32. The combination as set forth in claim 31 together with means for adjusting the first holder part on its mounting means so that the end of said pipette closely approaches said paper bed at one end of the path of reciprocating movement of said holder.

33. The combination as set forth in claim 31 together with means for adjusting the first holder part on its mounting means so that the end of said pipette closely approaches said paper bed at one end of the path of reciprocating movement of said holder; motive means for reciprocating said holder; and means for causing said motive means to stop only when said holder is at said one end of said path.

34. The combination as set forth in claim 31 together with means for adjusting the first holder part on its mounting means so that the end of said pipette closely approaches said paper bed at one end of the path of reciprocating movement of said holder; motive means for reciprocating said holder; means for causing said motive means to stop only when said holder is at said one end of said path; and releasable latch means for holding said holder part in said other position.

References Cited by the Examiner

UNITED STATES PATENTS

| | | | |
|---|---|---|---|
| 1,218,675 | 3/17 | Leininger | 24—66 |
| 1,992,464 | 2/35 | Blackman | 141—137 |
| 2,417,478 | 3/47 | Flowers | 24—250 |
| 2,562,815 | 7/51 | Oscroft | 141—329 X |
| 2,579,916 | 12/51 | Fleming | 141—146 X |
| 2,634,359 | 4/53 | Terry | 23—253 |
| 2,935,100 | 4/60 | Weinbrenner et al. | 141—131 |

MORRIS O. WOLK, *Primary Examiner.*

LAVERNE D. GEIGER, *Examiner.*